US012589553B2

(12) United States Patent
Gonzalez Martin et al.

(10) Patent No.: US 12,589,553 B2
(45) Date of Patent: Mar. 31, 2026

(54) EVALUATION OF 3D PRINTED OBJECTS

(71) Applicant: Peridot Print LLC, Palo Alto, CA (US)

(72) Inventors: Sergio Gonzalez Martin, San Cugat del Valles (ES); Marc Borras Camarasa, Sant Cugat del Valles (ES); Jordi Bautista Ballester, Sant Cugat del Valles (ES); Jordi Roca Vila, Sant Cugat del Valles (ES); Miguel Armero Jarava, Sant Cugat del Valles (ES)

(73) Assignee: PERIDOT PRINT LLC, Palo Alto, CA (US)

( * ) Notice: Subject to any disclaimer, the term of this patent is extended or adjusted under 35 U.S.C. 154(b) by 882 days.

(21) Appl. No.: 17/757,787

(22) PCT Filed: Jan. 15, 2020

(86) PCT No.: PCT/US2020/013600

§ 371 (c)(1),
(2) Date: Jun. 21, 2022

(87) PCT Pub. No.: WO2021/145867

PCT Pub. Date: Jul. 22, 2021

(65) Prior Publication Data

US 2023/0014420 A1    Jan. 19, 2023

(51) Int. Cl.
*B29C 64/386*    (2017.01)
*B33Y 50/00*    (2015.01)
*G06F 30/20*    (2020.01)
*G06F 113/10*    (2020.01)

(52) U.S. Cl.
CPC ............ *B29C 64/386* (2017.08); *B33Y 50/00* (2014.12); *G06F 30/20* (2020.01); *G06F 2113/10* (2020.01)

(58) Field of Classification Search
CPC .............................. B33Y 50/00; B29C 64/386
See application file for complete search history.

(56) References Cited

U.S. PATENT DOCUMENTS

| | | | |
|---|---|---|---|
| 10,054,530 B2 | 8/2018 | Swanner, Jr. et al. | |
| 2015/0042716 A1 | 2/2015 | Beier et al. | |
| 2015/0165683 A1 | 6/2015 | Cheverton et al. | |
| 2015/0269289 A1* | 9/2015 | Kim ....................... | G06T 17/00 |
| | | | 703/6 |
| 2015/0331402 A1* | 11/2015 | Lin ....................... | G05B 15/02 |
| | | | 700/119 |

(Continued)

FOREIGN PATENT DOCUMENTS

| | | | | |
|---|---|---|---|---|
| EP | 3376413 A1 | 9/2018 | | |
| WO | WO-2018070993 A1 * | 4/2018 | ............ | G06F 30/00 |

*Primary Examiner* — Bijan Mapar
(74) *Attorney, Agent, or Firm* — Michael Dryja

(57) ABSTRACT

A method comprises: obtaining object model data defining an object or objects to be built by a three-dimensional printing apparatus; determining an effect of carrying out a post-build process on the object or objects, wherein the determining uses the object model data and a computer-implemented evaluation of the post-build process and is carried out prior to building the object or objects, to identify portions of the object or objects that would not be processable by the cleaning process; and outputting an indication of non-processability of portions of the object or objects are determined not to be processable by the post-build process.

19 Claims, 5 Drawing Sheets

(56)            References Cited

U.S. PATENT DOCUMENTS

| | | |
|---|---|---|
| 2016/0074940 A1 | 3/2016 | Cote et al. |
| 2016/0136883 A1 | 5/2016 | Schmidt |
| 2019/0076925 A1 | 3/2019 | Lakshman et al. |
| 2019/0375018 A1* | 12/2019 | Erno ..................... B33Y 10/00 |

\* cited by examiner

Obtaining object model data defining an object

Determining an effect of carrying out a post-build process on the object to identify portions of the object that would not be processable by the post-build process Outputting an indication of non-processability of portions of the object that are determined not to be processable by the post-build process

100

101

102

103

200

201 PROCESSOR

202 MEMORY

210 — Object model data

211 — Instructions for computer-implemented evaluation of a post-build process

212 — Instructions for causing the processor to execute an evaluation of a post-build process for one or more objects

301

302

303

302

301

300

EVALUATION OF 3D PRINTED OBJECTS

BACKGROUND

Additive manufacturing techniques are capable of building three-dimensional, or 3D, objects with complex geometries. Objects formed using additive manufacturing processes may undergo a post-build or post-printing process such as a cleaning process after formation of the object, depending on the nature of the object and the build material from which it is formed. For some end-user applications, it is advantageous for objects to be suitably cleaned or processed in some other way after formation of the objects and prior to use. Failure to adequately clean an object may result in the object being unsuitable for the end user application and going to waste. Complex objects may comprise detailed or intricate geometries that make post-build processes difficult to complete.

BRIEF DESCRIPTION OF FIGURES

Methods and apparatus are described below, by way of example only, with reference to the accompanying drawings in which.

DETAILED DESCRIPTION

Figure 1:
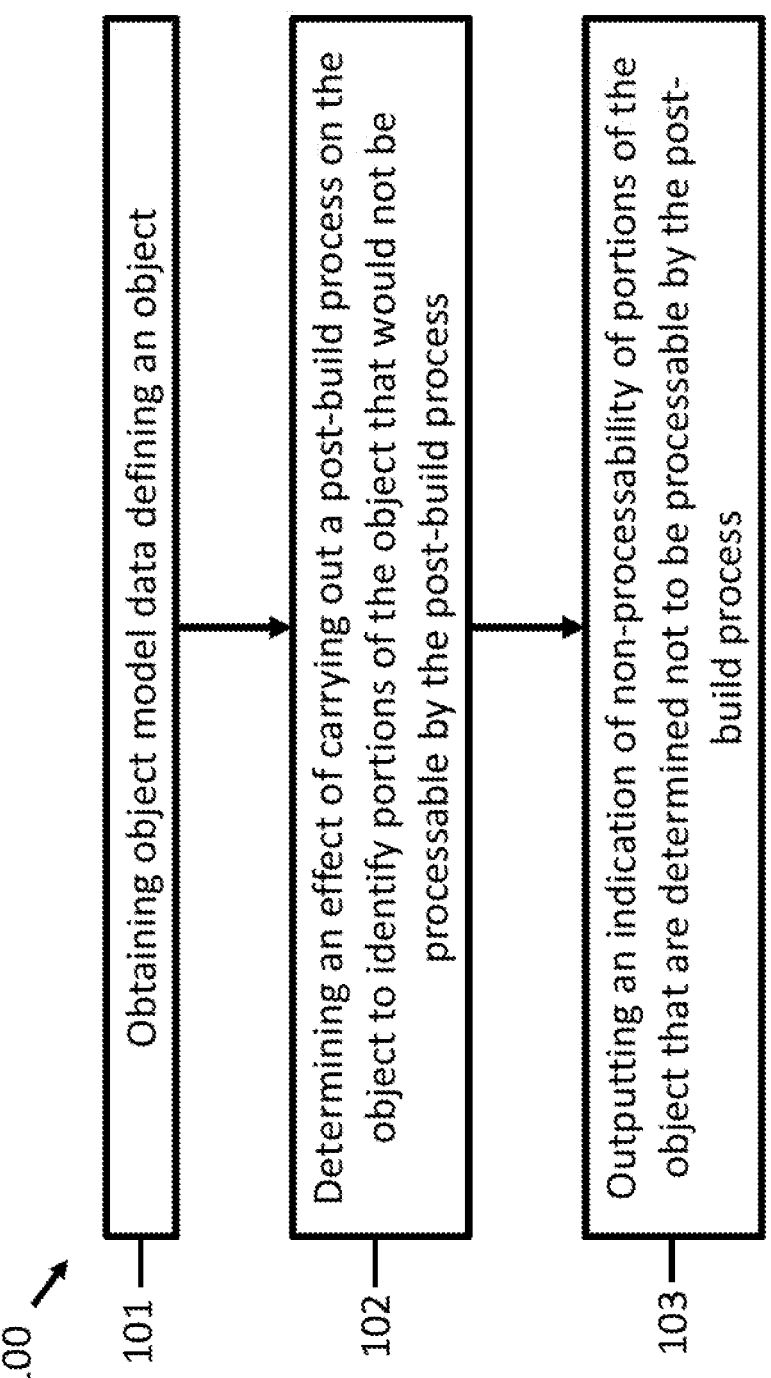
FIG. 1 is an example of a method that may be used to identify portions of an object or objects that would not be processable by a post-build process.

Provided are methods and 3D modelling applications for analysing a 3D model of an object, prior to building the object, to identify regions that will not be processed successfully by a particular post-build operation. The method and application carry out a computer-implemented evaluation of the suitability of the modelled object for successful performance of the post-build process. This can include automatic identification of fully-enclosed voids and other areas that cannot be reached by a particular post-build process. In an example, the evaluation is implemented as an evaluation of the effectiveness of a computer-implemented model or simulation of the post-build process, taking account of the object configuration, by execution of a computer program that models the effects of a process on an object having a particular configuration. The modelled or simulated process may be a cleaning process such as bead blasting, and the computer program may be executed by a computer processor to calculate the effects of this modelled/simulated bead blasting process on a modelled object. By calculating the effects of a simulated bead blasting process on an object from its object model data before the object has actually been built, systems and methods as described herein enable decisions to be made regarding the object configuration and/or post-build processes to be applied.

The method and application may take account of properties of the build material that are relevant to the effectiveness of the post-build process for that material. The use of a particular build material may be relevant due to the tendency for some build materials to flow more easily than others, whereas some powders have a tendency to form clusters. A simulation of a post-build process may be applied to a model of a 3D object prior to building the 3D object, allowing identification of difficult-to-process regions of the object. Identification of a difficult-to-process region may be reported to a user in advance of a build operation, to allow the user to assess the impact of the presence of such a region and allow subsequent action to be taken where relevant. When problems are identified, this may be reported to a user of the 3D modelling application prior to build data being sent to an additive manufacturing apparatus, or may be reported to a user of an additive manufacturing apparatus. Examples of additive manufacturing apparatus include 3D printers, powder fusion systems, powder sintering systems, binder jet systems and stereolithography systems.

Additive manufacturing systems may utilise powdered build materials for the formation of 3D objects. A powdered build material may comprise powders, spheres, granules, pellets, fibres, platelets, particles of irregular shape, hollow particles, and combinations thereof. In some examples the powder may be formed from, or may include, short fibres that may, for example, have been cut into short lengths from long strands or threads of material. In other examples, the powder may be formed from, or may include, substantially spherical particles. In yet other examples, the powder may be formed from, or may include particles of irregular shape. A build material may include polymeric material, metal material, ceramic material, any other suitable build material or combinations thereof. Examples of polymeric build materials include thermoplastic polyurethanes, polyamides, polypropylenes, polyethylenes, treaphthalates, and combinations thereof.

The consistency and quality of a 3D building process may be improved by selection of a build material that imparts desirable properties to a finished printed 3D object. For example, metallic build material may be used to form parts with greater object strength or parts that are electrically or thermally conductive whereas low-density polymeric materials may be used to form lightweight components. Different materials may impact the processability of an object once formed. In an example, some polymeric materials such as thermoplastic polyurethane, or TPU, have relatively high elasticity and stickiness and tend to form agglomerations even without any fusing or sintering or applied chemical bonding, and this may pose challenges when excess TPU powder is to be removed from confined spaces or from the surfaces of an object to which it has attached itself. Some build material may also have a surface chemistry that repels post-processing treatment such as paints. It may therefore be possible to increase the processability of a 3D printed object by selecting a different build material, if the different build material provides the built object with the properties desired by the end user.

Three-dimensional objects may be processed post-build by a process or multiple processes that each impart a desired property to an object or have a desired effect on an object. Common post-build or post-printing processes include cleaning, painting and surface treatments such as polishing. Objects may be cleaned by any suitable process including energetic particle abrasion processes such as bead blasting, pressured fluid methods such as water or air jet processes, grinding or sanding processes, solvent exposure, and heat treatment methods, among other cleaning methods. In an example, bead blasting is a cleaning process that may be applied to an object after it has been built. In another example, a cleaning process may comprise exposing an object to a cleaning brush or brushes. Painting processes may comprise spray painting, brush painting, submersion or similar techniques. The method and application may simulate the relevant post-build process that is intended for use after an object has been built. Regions of an object with limited processability may include: those which are enclosed, such as hollow cavities or recesses; those in proximity to areas of an object which physically obstruct the particular method of processing; or those that may be adversely impacted by exposure to a particular cleaning or other processing method such as finely detailed or fragile regions of an object. In this context, processability means the extent to which a process may be enacted such that it conditions or imparts the desired outcome to the relevant portions of the object being processed. In the context of a cleaning process, a high processability means that the object will be effectively cleaned across the majority of the object. In the context of a painting process, a low processability means that the object will be lacking in colour or pigmentation in many areas that were intended to be painted by the relevant process.

In an example, a method may comprise: obtaining object model data defining an object or objects to be built by a three-dimensional printing apparatus; determining an effect of carrying out a post-build process on the object or objects, wherein the determining uses the object model data and a computer-implemented evaluation of the effect of the process on the modelled object (e.g. using a simulation of the process and evaluating the effect of the simulated process) and is carried out prior to building the object or objects. The evaluation identifies portions of the object or objects that would not be processable by the post-build process; and can output an indication of non-processability of portions of the object or objects that are determined not to be processable by the post-build process.

In an example, the method and modelling application may use a simulation to identify specific portions of the modelled object or objects that are determined not to be processable by a post-build process, before the objects are built. For example, the simulation and evaluation may identify portions of the object or objects that are determined not to be cleanable by the cleaning process and/or may indicate a determined extent of non-cleaning. In another example, the simulation may identify portions of the object or objects that are determined not to be paintable by a painting process and/or may indicate a determined extent of non-painting. The method may display such information to the user via a suitable display and may display an alert that a particular post-build process will not be successful. The method and application may also generate an invitation to the user to consider taking corrective action, for example identifying a specific corrective action or set of specific corrective actions. When the method is used in conjunction with an additive manufacturing apparatus such as a 3D printer, the display of information may be provided using a printer interface, display screen or any other suitable display means. The method may also indicate the identification of a region with poor processability to a user via audio means such as the provision of text-to-speech broadcast via a speaker system.

The simulation may use a property or properties of a selected build material to identify portions of the object or objects that would not be processed by the post-build process if the objects are built using the selected build material. Properties of a build material that may be used when identifying non-processable areas may include: powder characteristics including particle size, particle shape, flowability, and geometric packing; material properties such as melting point, tackiness, strength, and surface chemistry; and any other relevant material property. In this example, the method may output information to a user which indicates non-processability of an object or regions of an object for the selected build material. In an example, a TPU build material may be identified as imparting poor cleanability to a portion of an object. In another example, a polyethylene build material may be identified as unsuitable for adhesion to a paint selected for use in a painting process.

The method may include the identification of a different build material and the indication of processability for the different build material. A user may specify a different build material by manual data input or selection from a predetermined list of materials via a computer user interface. In another example, the method may include the automatic identification of a different build material with better processability characteristics and the different build material may be identified and displayed to the user as part of the method. In such an example, the processability of an object formed using the different build material may be presented to the user and compared to the processability of the originally selected build material. The user may then be provided with the option of proceeding to build the desired object using the different build material if the simulated processability of the object is deemed acceptable if the different build material is to be utilised. In an example, the method and 3D modelling application may identify that the use of TPU will result in a region or regions of an object that will be poorly cleaned using a cleaning process selected by the user. The method may propose changing the build material from TPU to a polyamide build material with greater flowability than the original TPU build material. In another example, the method and 3D modelling application may identify that the use of polyethylene will result in poorly painted regions following a painting process. The method may propose changing the build material from polyethylene to a TPU material better suited for adhesion to a particular paint composition.

Corrective action available to a user when a region of limited processability is identified may involve modification of the design of an object determined to have regions of limited processability. In this situation, the method, in one example, includes outputting an indication of desirability of a design modification for the object or objects. In one example, the method may merely indicate to a user that a design modification is advisable to increase the processability of the object, without a specific proposal. In one example, the method may involve the use of a 3D design application to highlight anticipated processability problems for the current object upon a model of the current object design. The user may then manually alter the 3D design to mitigate the limitation on the post-build process. In another example, the method may simulate the processability of a different design option or a plurality of different design options for an object and provide the user with a modified 3D design or a set of different designs with improved processability characteristics. In an example, the 3D modelling application may propose changes to the design of the 3D object. Such changes may include the addition of a powder removal aperture or drainage hole, or a plurality of powder removal apertures or drainage holes, if the design includes cavities that do not have a route for powder to exit the cavity. Additionally or alternatively, the changes may achieve a reduction in the number of spatial obstructions or closed spaces, by changing the part geometry of the object.

The design modification may comprise the addition to the design of object model data for a removable three-dimensional filler component that at least partially fills a void within the identified portions of the object or objects that would not be processed. Once the three-dimensional object has been built, the three-dimensional filler component can be removed from the finished object. By avoiding the possibility of agglomeration of unbound, unfused or unsintered powder, the building of filler components reduces the need to clean or other otherwise treat the area that was occupied by the filler component—removal of the filler may enable or even replace a post-build treatment of a void, such as assisting bead blasting or removing the need for bead blasting by avoiding agglomeration of unbound, unfused or unsintered powder in the void. A modification to include a three-dimensional filler component may be performed where it is not possible to suitably modify the original 3D object without compromising the original intended function of the object. Three-dimensional fillers may beneficially have their design and/or creation automated within an additive manufacturing apparatus. Such three-dimensional fillers could be provided as an addition to an object model without modifying the original object model. In an example, the removable three-dimensional filler component may be a part negative which occupies a geometry that partly or wholly fills a region, space or cavity of an object, which would otherwise exhibit limited processability. In an example, the method may involve forming the three-dimensional filler component from a lattice or comparable structure. Forming the filler material from a lattice structure reduces the quantity of build material used to form the filler component when compared to formation of the same shape from solid non-latticed material and may provide flexibility to the filler material to aid in the removal of the filler from the built object. In additive manufacturing processes involving the use of fusing agents to fuse powdered build materials, the formation of the three-dimensional filler component from a lattice structure may reduce the amount of fusing agent consumed to form the component, and this may reduce the overall temperature of the system. The method may involve determining whether the filler component is geometrically capable of being removed from the object in which it is formed. Where it is determined that a single three-dimensional filler component may not be removable from the object, the removability of the filler component formed from a low density lattice may be determined. Where the method determined that there may be difficulty in the removal of the three-dimensional filler component from an object, a plurality of three-dimensional filler components may be formed instead. In this example, smaller three-dimensional sub-units may be formed that may be individually geometrically removable from the object.

The method may comprise proposing that the user adopt a modified or different post-build process to obtain the outcome desired by the user. Where the post-build process is a cleaning process, the simulation may determine that areas of an object which would be poorly cleaned by the user's selected cleaning method would be more effectively cleaned using another cleaning method or methods. In an example, the method may comprise the simulation of a particle-blasting process, such as bead blasting, for removal of build powder. In this example, the simulation may comprise simulation of the cleaning effects of energetic particles projected towards the object or objects to be built from each of a plurality of faces of a three-dimensional bounding box for the object or objects. If the simulation determines that areas of the object or objects to be built would be poorly cleaned, the simulation may simulate the cleaning of the object or objects using different cleaning processes such as solvent techniques or the use of brushes. If a different cleaning process is determined by simulation to provide a more effective clean, the method may display the different cleaning processes to the user and provide the user with the option to use the different cleaning process or processes displayed by the method. Alternatively, a 3D printer may be provided with a plurality of cleaning processes and the system may automatically select and perform an optimal cleaning process or a sequence of cleaning processes.

Where the post-build process is a painting process, the simulation may determine that areas of an object which would be poorly painted by the user's selected painting method would be more effectively painted using another painting method or methods. In an example, the method may comprise the simulation of a spray painting process for colouring of an object. In this example, the simulation may comprise determination of the areas of coverage and the extent of paint adhesion if paint droplets or particles are sprayed towards the object or objects to be built. In such an example, the direction of the spray of paint may be simulated from each of a plurality of faces of a three-dimensional bounding box for the object or objects. If the simulation determines that areas of the object or objects to be built would be poorly painted, the simulation may simulate the painting of the object or objects using different painting processes such as dipping techniques or the use of brushes. If a different painting process is found to provide a more substantial coverage of pigmentation when simulated, the method may display the different painting processes to the user and provide the user with the option to use the different painting process or processes displayed by the method—either for use as alternative or additional painting processes.

Some complex objects may involve the use of more than one course of corrective action to reduce the impact of areas of limited processability. In such situations, the method may indicate to the user that more than one action could or should be taken. In an example, the method may indicate to the user that the object should be redesigned and that a different cleaning methodology be adopted. In another example, the method may indicate that a different build material may be used in combination with the formation of a three-dimensional filler component. The corrective actions available to the user may be identified, proposed and combined in any suitable combination or sequence depending upon the post-build processing restrictions identified by the simulation.

The method may be provided as a user-selectable option amongst a set of selectable operations or may be performed automatically. More particularly, the method may be used with a three-dimensional printing apparatus that is adapted to build an object or objects from a build powder, wherein the simulation of the post-build process comprises a simulation of a process for treating or conditioning at least a portion of the object or objects. In an example, the simulation may comprise a simulation of a process for cleaning excess build powder from the object or objects. In this example, the user may choose to determine the cleanability of an object or objects to be formed by the three-dimensional printing apparatus, by selecting from a list of selectable operations prior to commencing a build job. In another example, the simulation may comprise a simulation of a process for imparting a colour or pigment to at least a portion of the object or objects. In these examples, the simulation of cleanability or paintability of an object or objects may be performed automatically in advance of a build job without active selection by the user.

The method may be used in conjunction with an apparatus which may comprise a processor; a memory for storing object model data defining a three-dimensional object or objects to be built by a three-dimensional printing process, and for storing instructions for a computer simulation of a post-build process for the object or objects, and a set of instructions for causing the processor to execute a computer simulation of a post-build process for an object or objects, prior to building the object or objects, to determine an effect of the post-build process on the object or objects, wherein the instructions for determining use the object model data for the object or objects as an input to the computer simulation of the post-build process and execute the computer simulation to identify portions of the object or objects that are non-processable by the post-build process, and output an indication of non-processability if portions of the object or objects are determined to be non-processable by the post-build process. In an example, the apparatus may be integrated within an additive manufacturing system to enable assessment of an object model prior to building the object or objects. In a further example, the apparatus may be integrated within an object modelling system to enable assessment of an object model via the computer simulation.

FIG. 1 shows an example of a method 100 that may be used to determine and output the processability of a three-dimensional object. The method comprises obtaining 101 object model data defining an object or objects to be built by a three-dimensional printing apparatus; determining 102 an effect of carrying out a post-build process on the object or objects, wherein the determining uses the object model data and a simulation of the post-build process and is carried out prior to building the object or objects, to identify portions of the object or objects that would not be processable by the post-build process; and outputting 103 an indication of non-processability of portions of the object or objects are determined not to be processable by the post-build process. The object model data may be generated by a 3D modelling application program running on a local computer system, or may be loaded into system memory from a data storage device connected to the local computer system, or may be received from remote data storage via a communication mechanism.

Figure 2:
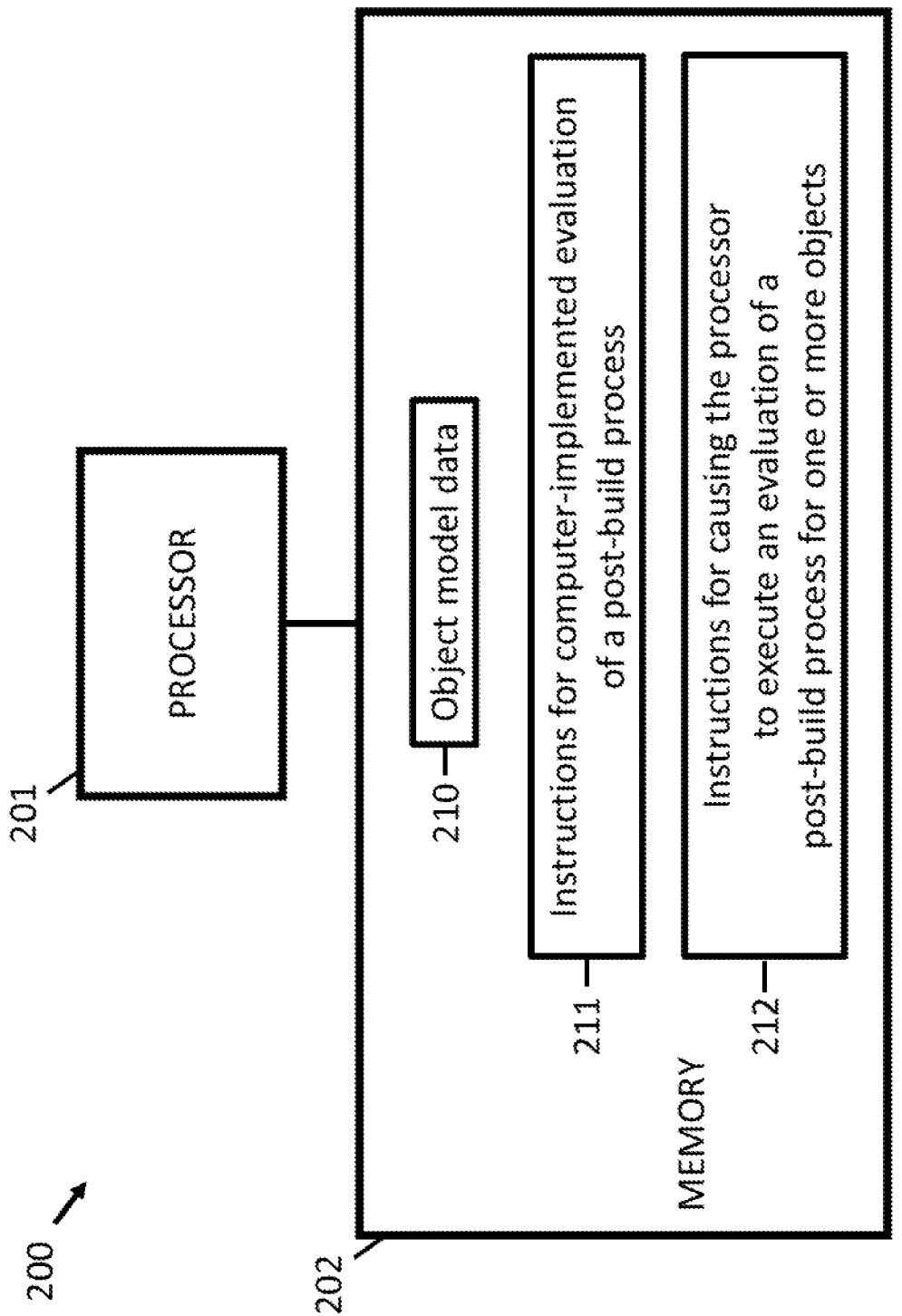
FIG. 2 is an example of apparatus comprising a processor and a memory.

FIG. 2 shows an example of apparatus 200 comprising a processor 201 and a memory 202. The memory 202 of the apparatus 200 is suitable for storing object model data 210 defining a three-dimensional object or objects to be built by a three-dimensional printing process, and for storing instructions 211 for a computer simulation of a post-build process for the object or objects, and a set of instructions 212 for causing the processor to execute a computer simulation of a post-build process for object or objects, prior to building the object or objects, to determine an effect of the post-build process on the object or objects.

Figure 3:
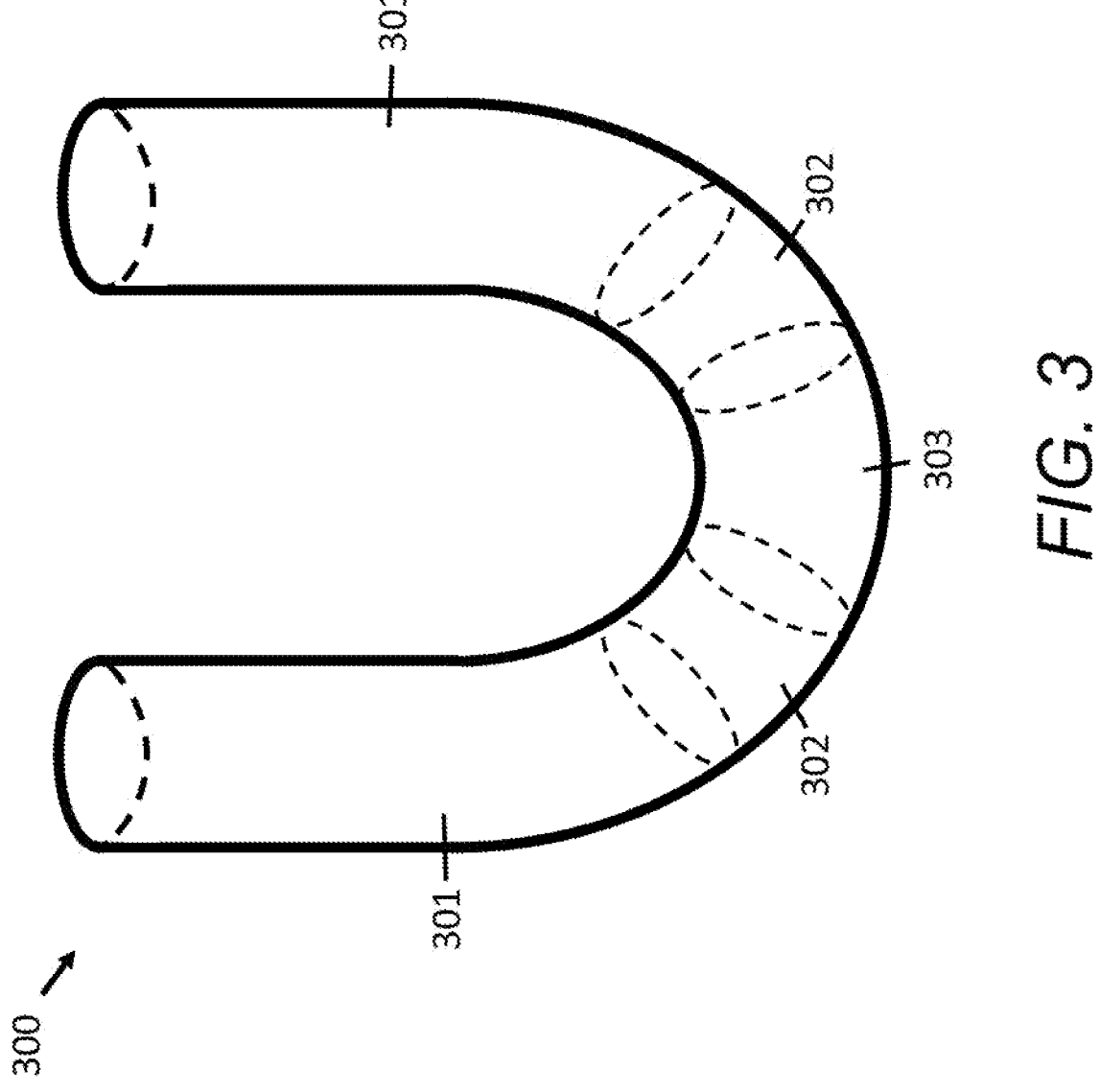
FIG. 3 is a cross-section of an example of a 3D object with regions that may not be cleaned by a cleaning process.

FIG. 3 shows a cross-section of an example of a U-shaped three-dimensional object 300 that may be formed using an additive manufacturing apparatus. Prior to commencing a build job to form object 300, a user may utilise the method shown in FIG. 2 to determine the processability of the object. When a post-build cleaning process is to be used, the simulation may determine a region or regions with different processability, such as cleanability or paintability characteristics, and indicate these regions to the user on a two- or three-dimensional model of the object. For example, FIG. 3 shows two regions of good processability 301, two regions of intermediate processability 302 and a region of limited or poor processability 303. Each region of processability may be assigned a processability index, such as a cleanability index or a paintability index, by the simulation to allow the user to quickly identify and assess the relative degree of processability of each region.

In an example, the cleanability index for processes adopting an energetic particle abrasion cleaning process may be calculated by determining and establishing a bounding box of the 3D model of the object to be built. In an example where the cleaning process is bead blasting, once the bounding box has been established, simulated projection of energetic particles in random directions from each of the six faces of the box is used to simulate random direction bead blasting. This is used in object analysis via simulation of the effect of bead blasting from all faces of the bounding box, and therefore simulating energetic particles being incident on the built object from all possible directions. The input geometry may be a polygon mesh, such as a triangle mesh. For each face, N particles are generated and are uniformly distributed across the face of the bounding box. In an example, N may be of the order of magnitude of $10^5$. For a three-dimensional model, a cleaning index is defined and set to 0. The movement and energy loss of the N particles are then simulated to approach the walls of the 3D model from different randomised directions. In this example, each simulated particle is assumed to start its bead blasting process with equivalent speed and energy. When a particle collides with a given polygon of the 3D model, the cleaning index of the polygon is modified as a function of the energy E of the particle at the time of collision. In an example, the cleaning index CI may be determined using the following formulae where A and B are parameters that can be changed depending on the material:

$$\text{If } E > \times E: \text{CI} = A/(1 + \exp(-E)) + B$$

$$\text{If } E <= \Delta E: \text{CI} = 0$$

In another example, the cleaning index CI may be determined using the formulae:

$$\text{If } E > \times E: \text{CI} = B/(1 + \exp(-A*E)) - 0.5$$

$$\text{If } E <= \Delta E: \text{CI} = 0$$

The parameter A models the stickiness or the material. In an example, a TPU build material may have an A value of 1 whereas in another example a polyamide build material may have an A value of 0.05. The parameter B represents the resilience or strength of the particles used in the cleaning process. For the cleaning index to be positive, values of B are also positive for a given collision. Particles with a negative value of B are no longer suitable to clean and are presumed to perform no further collisions.

In each simulated collision event, a particle will lose an amount of energy Δ E. Particle pathing is tracked by the simulation and its collisions iterated until a given particle either leaves the bounding box or possess a simulated energy of less than ΔE. If the simulation determines that a polygon will experience multiple collisions, the cleaning index is accumulated across all collisions. The simulation repeats this process for the same face of the bounding box K times. In an example, K may be in the order of magnitude of $10^4$.

The determination of cleaning index by the simulation may be subject to a post-processing operation or operations. For instance, the cleaning index of a polygon may be determined by calculating the average cleaning index of each neighbouring polygon. In an example, this post processing operation may be performed to mitigate a random distribution of particle velocities which may be applied to the particles in the simulation.

A polygon in the mesh corresponding to a surface area of the three-dimensional object may be deemed unable to be effectively cleaned if the polygon is determined to have a cleaning index below a threshold value. The threshold value is determined by the build material to be used and the physiochemical characteristics thereof. The simulation may output a value of cleanability defined per each polygon of the polygon mesh geometry that is used to represent the object's surface. In this example, each polygon may be colour coded depending on their cleanability so that the client can easily identify the regions of good, intermediate and limited cleanability. The sum of the area of all the polygons which are below a predetermined value of cleanability may be used to define the overall cleaning index of a 3D model. The overall cleaning index may provide a user with a high level indication of the percentage area of an object may not be suitably cleaned. The overall cleaning index OCI may be calculated using the formula:

$$OCI=(\Sigma A\_(\text{polygons below threshold cleanability}))/(\text{Total Area})*100$$

In another example, the paintability index PI for objects adopting a post-build painting process may be calculated by determining and establishing a bounding box of the 3D model of the object to be built. In an example where the painting process is brush painting, the size and relative accessibility of the brush from each face of the bounding box may be simulated using directional approach vectors and the sizes of accessible void spaces as part of the simulation to determine the regions in which a paint-laden brush may contact the surfaces of an object. In an example where the painting process is spray painting, once the bounding box has been established, simulated projection of pigment particles or paint droplets in known directions, pseudo-random directions or random directions from each of the six faces of the box may be used to simulate various modes of spray painting. This approach is used in object analysis via simulation of the effect of spray painting from all faces of the bounding box, and therefore simulating the path and coverage of particles or droplets incident on the object from all possible directions, using the object model. The input geometry may be a polygon mesh, such as a triangle mesh. For each face, N particles or droplets are generated and are uniformly distributed across the face of the bounding box. In an example, N may be of the order of magnitude of $10^5$. For a three-dimensional model, a paintability index is defined and set to 0. The movement of the N particles or droplets are then simulated to approach the walls of the 3D model from different known, pseudo-randomised, or randomised directions. In this example, each simulated particle or droplet is assumed to start the painting process with equivalent speed and energy. When a particle or droplet collides with a given polygon of the 3D model, the paintability index of the polygon is modified as a function of the energy E of the particle at the time of collision. An example formulae that may be used in the method is:

$$\text{If } E=\Delta E \text{ } PI=B/(1+\exp(-A*E))-0.5$$

In a further example, the paintability index of the polygon may be modified by the particle size S of the particle at the time of collision. In another example, the paintability index of the polygon may be modified by a function of both the particle size S and particle energy E of the particle at the time of collision.

In one example where a paint material will adhere to a surface upon contact, each particle will experience a single collision and so subsequent collisions will not be simulated.

If a paint material is used such that the simulation determines that a polygon will experience multiple collisions, the paintability index is accumulated across all collisions. The simulation repeats this process for the same face of the bounding box K times. In an example, K may be in the order of magnitude of $10^4$.

The determination of paintability index by the simulation may be subject to a post-processing operation or operations. For instance, the paintability index of a polygon may be subject to a correction factor that is determined by calculating the average paintability index of each neighbouring polygon. In an example, this post processing operation may be performed to take account of the coverage of individual paint droplets that may collide with a surface at the boundary between polygons of the mesh.

A polygon in the mesh of the three-dimensional object may be deemed unable to be effectively painted if the polygon is determined to have a paintability index below a threshold value. The threshold value may be determined by the build material to be used and the physiochemical characteristics thereof, the surface area to be coated, the surface area of an individual polygon, the desired colour of the object, the composition of the paint to be used, and any other suitable consideration. The simulation may output a value of paintability defined per each polygon of the polygon mesh geometry that is being used to represent the surface of the built object. In this example, each polygon may be colour coded in a display of the results of the simulation to represent their paintability, so that the user can easily identify the regions of good, intermediate and limited paintability. The sum of the area of all the polygons which are below a predetermined value of paintability may be used to define the overall paintability index of a 3D model. The overall paintability index may provide a user with a high level indication of the percentage area of an object may not be suitably painted. The overall paintability index OPI may be calculated using the formula:

$$OPI=(\Sigma A\_(\text{polygons below threshold paintability}))/(\text{Total Area})*100$$

The presence of enclosed spaces, cavities or hollow areas in an object may result in the polygons of the mesh that are unable to be painted or cleaned during simulation due to the absence of any suitable pathway for particles or droplets of the post-build process to enter the cavity or for excess build material held within the cavity to leave the cavity. If the method determines this to be the case, the method may identify that a redesign of the object or objects will provide a mesh with polygons of an acceptable cleaning index, paintability index, overall cleaning index, overcall paintability index, or any other suitable index associated with a post-build process. In the example of cleaning an obstructed cavity, the corrective action may involve the inclusion or a drainage pathway or aperture in the object to allow the build material to be removed from an enclosed space during the cleaning process. The method may propose an object with a revised geometry that provides mesh polygons with acceptable cleaning indices.

Figures 4A, 4B:
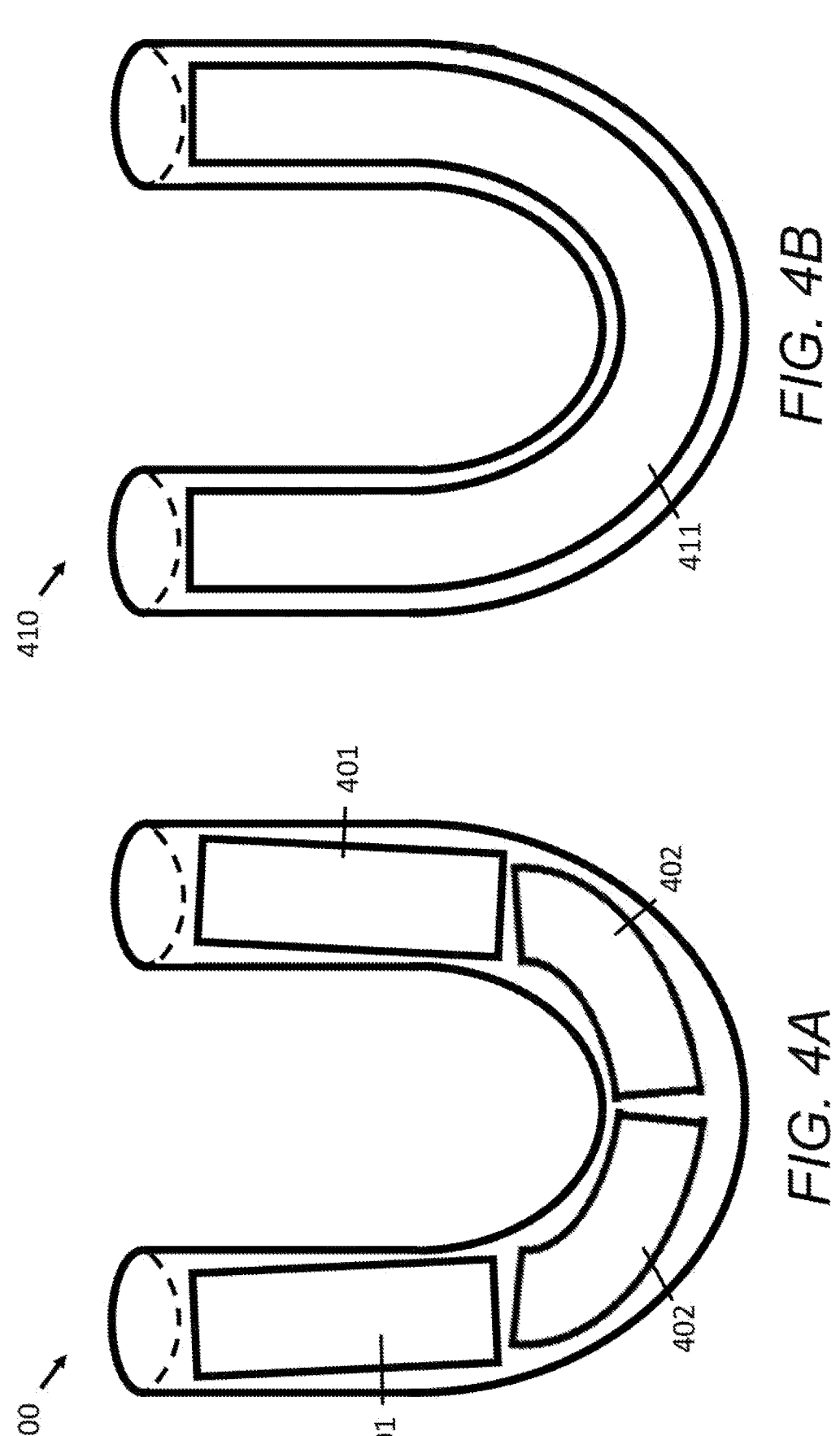
FIGS. 4A and 4B are cross-sections of an example of a 3D object with a removable insert formed inside a cavity of the 3D object.

FIGS. 4A and 4B show cross-sections of an example of a 3D object 400, 410 with removable inserts 401 and 402, or removable insert 411, formed inside a respective cavity of the 3D object. Formation of a removable insert such as insert 411 may be one corrective action taken by a user if the processability, and in some particular examples the cleanability index of a particular area of an object, or the overall cleaning index of an object, is too low. As indicated in FIG. 3, regions of the U-shaped object may be identified by the simulation as of limited cleanability 301, 302, 303. Formation of removable insert 411 allows the insert to be removed from the object post-manufacturing. As a significant proportion of the inner cavity volume of the object 410 is occupied by the removable insert, removal of the insert restores the void of the cavity and prevents the build-up of residual build material in regions of the object previously occupied by the insert. In examples where an object to be formed 400 will adopt a rigid shape, an insert matching the whole negative geometric profile of a cavity such as insert 411 may not be physically removable from the object 410 it occupies. FIG. 4A demonstrates one possible method of forming a removable insert from a plurality of segments 401, 402. In this example, the linear regions of the U-shaped object are filled with cylindrical inserts 401 whereas the curved portion of the U-shape is filled with curved cylindrical inserts 402. Once the object 400 has been formed in an additive manufacturing process, the inserts 401, 402 may be removed by pushing or pulling them through the cavity of the rigid object. In the examples of both FIGS. 4A and 4B, the removable inserts may be formed as a lattice structure with interstitial voids to increase the flexibility and removability of the insert while also reducing the quantity of build material consumed in the formation of the insert.

The method may assess whether the cleaning index of the polygons of the simulated mesh would fall below the threshold of limited cleanability if a different build material were to be used to form the object or objects to be formed. If a different build material is determined to provide an object where the triangles in the mesh have an acceptable cleaning index post-simulated cleaning then the method may provide the user with an indication of such build materials. In an example, the method may determine that a triangle in the object mesh will have limited cleanability when a TPU build material is used but will have an acceptable cleanability when the object or objects are formed with a polyamide or polypropylene build material.

Figures 5A, 5B:
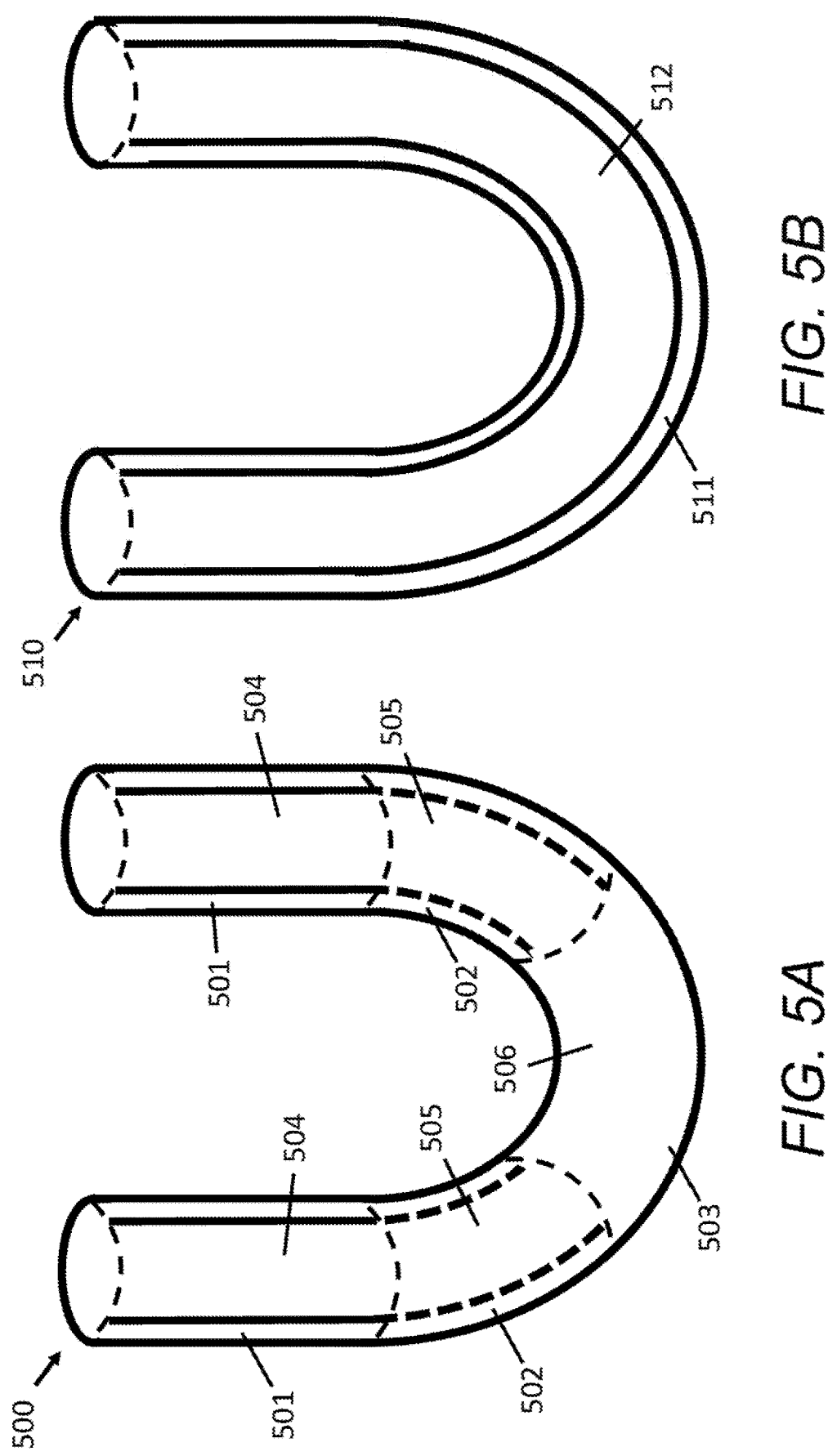
FIGS. 5A and 5B are cross-sections of an example of a 3D object which has been painted using various processes.

FIGS. 5A and 5B show cross-sections of an example of a 3D object 500, 510. FIG. 5A shows an example of an object 500 which has been spray painted after building. In the example of FIG. 5A, regions of the object 504 have a high paintability index and a consistent layer of paint 501 providing good coverage has been formed in these regions of the object. Regions 505 have a moderate paintability index and an uneven or incomplete layer of paint 502 has been formed in these regions due to the distance the paint will travel down the inside of the object and the physical obstruction provided by the linear portions of the object which prevent paint from easily accessing regions 505 of the object when paint is sprayed. Region 506 of the object has a low paintability index approaching 0 as it is distant from the apertures in the object through which paint may pass and further obstructed from paint particles by the inner curvature of the object. Region 506 has no paint coverage 503 or a low paint coverage. In an example, if the method identifies that regions 505 or 506 of the object would be imparted moderate, little or no paint coverage 502, 503 by a spray painting process, one corrective action taken by a user may be to utilise a dipping paint process. In an example, the method may determine that a dipping painting process will impart the object with a single region of good paintability 512 with a high paintability index, resulting in consistent coverage of paint 511 across the surface of the object 510 as shown in FIG. 5B. In this example, the method may suggest using a dip painting process in place of a spray painting process. In another example, the method may display an image showing the regions 504, 505 and 506 a three-dimensional representation of the object 500 to a user and display comparative object 510 showing region 512. In this example, the user may select which of the spray or dip painting processes to use based on the information displayed.

The invention claimed is:

1. A method comprising:

obtaining, by a processor, object model data defining an object to be built by a three-dimensional printing apparatus by selectively fusing layers of build powder;

simulating, by the processor and using the object model data, a cleaning process to remove excess build powder from the object after having been built, to identify whether the object has portions that would not be processable by the cleaning process after the object has been built;

in response to determining that there are no portions of the object that would not be processable by the cleaning process, causing, by the processor, the three-dimensional printing apparatus to build the object using the object model data; and in response to determining that there are portions of the object that would not be processable by the cleaning process, outputting, by the processor, an indication of non-processability of the portions that would not be processable by the cleaning process, instead of causing the three-dimensional printing apparatus to build the object using the object model data.

2. The method of claim 1, wherein the indication of non-processability identifies specific portions of the object that would not be processable by the cleaning process and/or indicates a determined extent of non-processability.

3. The method of claim 1, wherein simulating the cleaning process further uses a property of a selected build material of the build powder to be used by the three-dimensional printing apparatus to build the object.

4. The method of claim 3, further comprising, in response to determining that there are portions of the object that would not be processable by the cleaning process, outputting, by the processor, an identification of a different build material and an indication of processability for the different build material if the three-dimensional printing apparatus were to instead build the object using the different build material.

5. The method of claim 1, further comprising, in response to determining that there are portions of the object that would not be processable by the cleaning process, outputting, by the processor, a proposal for a design modification of the object that would improve processability of the object by the cleaning process after the object has been built.

6. The method of claim 5, wherein the design modification comprises addition of a powder removal aperture within the object.

7. The method of claim 5, wherein the design modification comprises addition of object model data for a removable three-dimensional filler component that is shaped to fill a void within the portions of the object that would not be processable by the cleaning process.

8. The method of claim 1, further comprising, in response to determining that there are portions of the object that would not be processable by the cleaning process, outputting, by the processor, a proposal for a modified post-build process by which the object is better processable to remove the excess build powder from the object after having been built.

9. The method of claim 1, wherein the cleaning process that is simulated comprises a particle-blasting process for removal of build powder, and wherein simulating the cleaning process is further to determine cleaning effects of energetic particles projected towards the object from each of a plurality of faces of a three-dimensional bounding box for the object.

10. The method of claim 1, wherein the cleaning process is selected by a user from a plurality of cleaning process options.

11. A three-dimensional printing apparatus comprising:

a processor;

a memory storing instructions executable by the processor to perform processing comprising:

receiving, object model data defining an object to be built by the three-dimensional printing apparatus by selectively fusing layers of build powder;

simulating, using the object model data, a cleaning process to remove excess build powder from the object after having been built, to identify whether the object has portions that would not be processable by the cleaning process after the object has been built;

in response to determining that there are no portions of the object that would not be processable by the cleaning process, building the object using the object model data; and in response to determining that there are portions of the object that would not be processable by the cleaning process, outputting an indication of non-processability of the portions that would not be processable by the cleaning process, instead of building the object using the object model data.

12. The three-dimensional printing apparatus of claim 11, wherein the indication of non-processability identifies specific portions of the object that would not be processable by the cleaning process and/or indicates a determined extent of non-processability.

13. The three-dimensional printing apparatus of claim 11, wherein simulating the cleaning process further uses a property of a selected build material of the build powder to be used by the three-dimensional printing apparatus to build the object.

14. The three-dimensional printing apparatus of claim 13, wherein the processing further comprises, in response to determining that there are portions of the object that would not be processable by the cleaning process, outputting an identification of a different build material and an indication of processability for the different build material if the three-dimensional printing apparatus were to instead build the object using the different build material.

15. The three-dimensional printing apparatus of claim 11, wherein the cleaning process that is simulated comprises a particle-blasting process for removal of build powder, and wherein simulating the cleaning process is further to determine cleaning effects of energetic particles projected towards the object from each of a plurality of faces of a three-dimensional bounding box for the object.

16. The three-dimensional printing apparatus of claim 11, wherein the cleaning process is selected by a user from a plurality of cleaning process options.

17. A method comprising:

obtaining, by a processor, object model data defining an object to be built by a three-dimensional printing apparatus by selectively fusing layers of build powder;

simulating, by the processor and using the object model data, a painting process to color the object after having been built, to identify whether the object has portions that would not be processable by the painting process after the object has been built;

in response to determining that there are no portions of the object that would not be processable by the painting process, causing, by the processor, the three-dimensional printing apparatus to build the object using the object model data; and in response to determining that there are portions of the object that would not be processable by the painting process, outputting, by the processor, an indication of non-processability of the portions that would not be processable by the painting process, instead of causing the three-dimensional printing apparatus to build the object using the object model data.

18. The method of claim 17, wherein the indication of non-processability identifies specific portions of the object that would not be processable by the painting process and/or indicates a determined extent of non-processability.

19. The method of claim 17, wherein simulating the painting process is further to determine an effective coverage of color coverage from pigment particles projected towards the object from each of a plurality of faces of a three-dimensional bounding box for the object.

* * * * *